United States Patent
Stählin et al.

(10) Patent No.: US 9,046,440 B2
(45) Date of Patent: Jun. 2, 2015

(54) DEVICE FOR TESTING A SAFETY AND/OR DRIVER ASSISTANCE SYSTEM

(75) Inventors: Ulrich Stählin, Eschborn (DE); Adam Swoboda, Groβ-Gerau (DE); Anselm Keil, Hofheim (DE); Xiuxun Yin, Duisburg (DE); Sighard Schräbler, Karben (DE)

(73) Assignee: Continental Teves AG & Co. oHG (DE)

( * ) Notice: Subject to any disclaimer, the term of this patent is extended or adjusted under 35 U.S.C. 154(b) by 140 days.

(21) Appl. No.: 13/812,562

(22) PCT Filed: Jul. 20, 2011

(86) PCT No.: PCT/EP2011/062435
§ 371 (c)(1),
(2), (4) Date: Jan. 28, 2013

(87) PCT Pub. No.: WO2012/013552
PCT Pub. Date: Feb. 2, 2012

(65) Prior Publication Data
US 2013/0144484 A1 Jun. 6, 2013

(30) Foreign Application Priority Data
Jul. 29, 2010 (DE) .......................... 10 2010 038 639

(51) Int. Cl.
*G01M 17/00* (2006.01)
*G06F 7/00* (2006.01)
*G01M 17/007* (2006.01)
*G08G 1/16* (2006.01)
*G09B 19/00* (2006.01)

(52) U.S. Cl.
CPC ............. *G01M 17/007* (2013.01); *G08G 1/164* (2013.01); *G09B 19/00* (2013.01)

(58) Field of Classification Search
CPC ....... G01M 17/007; G07C 5/008; G01L 5/28; B60W 20/00
USPC ................................................ 701/32.8, 29.8
See application file for complete search history.

(56) References Cited

U.S. PATENT DOCUMENTS 6,611,744 B1 * 8/2003 Shimazaki et al. ............. 701/41
2009/0051609 A1 * 2/2009 Packer et al. .................. 343/718

(Continued)

FOREIGN PATENT DOCUMENTS

DE  10 2007 021 666  11/2008
DE  10 2007 035 474   2/2009

(Continued)

OTHER PUBLICATIONS

Ammoun et al., "Real-time crash avoidance system on crossroads based on 802.11 devices and GPS receivers", IEEE Intelligent Transportation Systems Conference, Sep. 17-20, 2006, pp. 1024-1027.
International Search Report corresponding to International Application No. PCT/EP2011/062435, dated Nov. 15, 2011.

*Primary Examiner* — Behrang Badii
*Assistant Examiner* — Daniel L Greene
(74) *Attorney, Agent, or Firm* — RatnerPrestia

(57) ABSTRACT

A dummy device for testing a driver assistance system of a vehicle traveling on a roadway. The dummy device travels above the roadway, and includes a transceiver and a processor to test the driver assistance system of the vehicle by simulating a driver assistance system of another vehicle.

9 Claims, 2 Drawing Sheets

(56) References Cited

U.S. PATENT DOCUMENTS

2010/0161173 A1* 6/2010 Nitz et al. .................. 701/33
2010/0170330 A1* 7/2010 Scheepers et al. ......... 73/116.01
2011/0098877 A1* 4/2011 Stahlin et al. ............... 701/33
2011/0118979 A1* 5/2011 Mao et al. .................. 701/208
2012/0191271 A1* 7/2012 Stuebing ..................... 701/2

FOREIGN PATENT DOCUMENTS

| DE | 10 2008 051 233 | 5/2009 |
| DE | 10 2009 048 285 | 4/2010 |
| EP | 2 237 119 | 10/2010 |
| WO | WO 2009/103384 | 8/2009 |

* cited by examiner

DEVICE FOR TESTING A SAFETY AND/OR DRIVER ASSISTANCE SYSTEM

CROSS REFERENCE TO RELATED APPLICATIONS

This application is the U.S. National Phase Application of PCT International Application No. PCT/EP2011/062435, filed Jul. 20, 2011, which claims priority to German Patent Application No. 10 2010 038 639.1, filed Jul. 29, 2010, the contents of such applications being incorporated by reference herein.

FIELD OF THE INVENTION

The present invention relates to a device for testing a safety and/or driver assistance system of a first vehicle with the participation of at least one second vehicle in the region of a fixedly predefined roadway section, in particular in the region of an intersection, wherein the first vehicle and the at least one second vehicle comprise in each case at least one transmitter and/or at least one receiver for C2X communication in connection with the safety and/or driver assistance system.

BACKGROUND OF THE INVENTION

The term C2X communication describes the communication between a vehicle and at least one further vehicle or an infrastructure device. The communication between vehicles (referred to hereinunder in short as the C2C communication) and the communication between a vehicle and an infrastructure device (referred to hereinunder in short as the C2I communication) will become of ever increasing importance in future for controlling vehicles, in particular for the work of safety and/or driver assistance systems in vehicles.

An important application of the C2X communication is a driver assistance system that is intended to support the driver at an intersection and to assist in avoiding accidents. This driver assistance system is also called an intersection assistant. Typical variants of an intersection assistant are the transverse traffic assistant and the left turn assistant but the intersection assistant is not limited to these two variants. Conventional test devices for an assistant of this type are frequently not able to test all variants of the application. The test of an assistant of this type is used in particular for the purpose of recognizing errors when using the system or to further develop the system. Critical situations can in fact occur when testing the intersection assistant, for example, two vehicles that are participating in the test can collide and consequently cause damage to the vehicles or to the persons participating.

The document DE 10 2009 048 285 A1, which is incorporated by reference, describes the C2X communication with respect to a speed indicator in the vehicle. In this case, a desired or recommended speed of the vehicle is indicated in a second display device in addition to a tachometer, wherein the desired or recommended speed, for example speed limitations, minimum speeds, target speeds or the like, is determined inter alia from a communication with other vehicles or infrastructure devices, such as with a traffic light that is arranged at an intersection. The known speed indicator does not provide any improvements with respect to the problem described above when testing an intersection assistant.

SUMMARY OF THE INVENTION

An aspect of the present invention consequently resides in providing a simple test device for a safety and/or driver assistance system of a vehicle, wherein damage to the vehicles is avoided or kept to a minimum.

The above aspect is achieved by means of the device for testing a safety and/or driver assistance system of a first vehicle with the participation at least of one second vehicle in the region of a fixedly predetermined roadway section, wherein the first vehicle and the at least one second vehicle comprise in each case at least one transmitter and/or at least one receiver for the C2X communication in connection with the safety and/or driver assistance system, wherein the second vehicle is represented by a dummy device that moves in the region of the roadway section, said dummy device having the largest portion of its volume and/or its mass outside the movement of the first vehicle. In particular, the at least one second vehicle is represented by in each case a dummy device that moves in the region of the roadway section, said dummy device having the largest portion of its volume and/or its mass outside the movement of the first vehicle.

Instead of using 2 vehicles to test the safety and/or driver assistance system in a fixedly predetermined roadway section, for example at an intersection, one of the two vehicles is accordingly replaced by a dummy device. This dummy device moves with the largest portion of its volume and/or its mass outside the space, in that the first vehicle can normally move in the predetermined roadway section. This three-dimensional space that is occupied by the entire volume of the first vehicle is also described as the movement space of the first vehicle. Since the largest portion of the volume and/or of the mass of the dummy device can thus not collide with the first vehicle, damage to the first vehicle is reduced or kept to a minimum.

Roads, paths, squares or other locations are described as a roadway along which a vehicle can move.

The above described dummy device is used in particular for testing assistance systems that are used in intersection situations, for example for testing the transverse traffic assistant, a left turn assistant, etc.

In a further development of the invention, the dummy device is embodied as a slide that moves above, below and/or to the side of the movement space of the first vehicle. A slide of this type represents a particularly simple embodiment of a dummy device. In so doing, the slide preferably moves on rails or at least on a cable, for example over the roadway section, or in a channel in the base below the fixedly predetermined roadway section.

For example, the slide can be moved along or drawn along on one or a plurality of cables that hang over the roadway section. In so doing, it should preferably be ensured that the slide is guided along in sufficient proximity to the roadway section, so that it is not perceived as a vehicle that is travelling across a bridge.

In the case of the slide moving in a channel in the base of the roadway section, the channel could be embodied in such a manner that the first vehicle can move away over the channel without risk.

A further option for achieving the dummy device resides in embodying said dummy device as a flying device, for example as a helicopter, as an airplane, as an element that is attached to a helicopter or to an airplane or as a floating platform.

When embodying the dummy device as disclosed above, it could be problematic when using the test data that the emission characteristics of the transmitter (antenna) and/or the reception characteristics of the receiver of the C2X communication of the dummy device and those of the second vehicle that is represented thereby differ, so that malfunctions can occur when using the driver assistance system or safety system. In order to prevent this, the at least one receiver for the C2X communication and/or the at least one transmitter for the C2X communication of the dummy device can protrude into the movement space of the first vehicle, wherein the at least one receiver for the C2X communication and/or the at least one transmitter for the C2X communication of the dummy device are preferably embodied in a flexible manner. As a consequence, only preferably flexible antennae or receivers protrude out of the channel into the movement space of the first vehicle. If only these collide with the first vehicle, they cause at the most a small amount of damage to the first vehicle.

In order to be able to improve the manner in which the test using the device in accordance with the invention proceeds, it is advantageous if the dummy device can be remotely controlled. Preferably, the remote control operation is to be provided in such a manner that it can activate the dummy device and/or it can configure parameters of the dummy device, for example the speed, the speed profile and/or messages that are to be transmitted by the dummy device.

In order to achieve an as realistic as possible dummy device with respect to the at least one second vehicle, it is of advantage if the dummy device is embodied in such a manner, that at least one sensor and/or at least one driver assistance system and/or at least one safety system of the second vehicle that is represented by the dummy device are simulated. For example, the steering wheel angle, the transverse acceleration, yaw rate or brake pedal travel distance and speed are simulated in order to transmit this data by means of the C2X communication.

In addition, it is expedient if the dummy device is equipped with means, for example with at least one dummy and/or with at least one reflector, that render it possible to recognize the dummy device by means of at least one environment sensor (e.g. radar, lidar, camera or the like) of the first vehicle to be tested.

The vehicles concerned in the case of the first and the at least one second vehicle are, for example, a motor vehicle, such as a car, bus or heavy goods vehicle, but they can also be a rail-borne vehicle, a ship, an aircraft, such as a helicopter or airplane, or, for example, a bicycle.

BRIEF DESCRIPTION OF THE DRAWINGS

The invention is best understood from the following detailed description when read in connection with the accompanying drawings. Included in the drawings is the following figures.

The figure schematically shows.

DETAILED DESCRIPTION OF THE PREFERRED EMBODIMENTS

Figure 1:
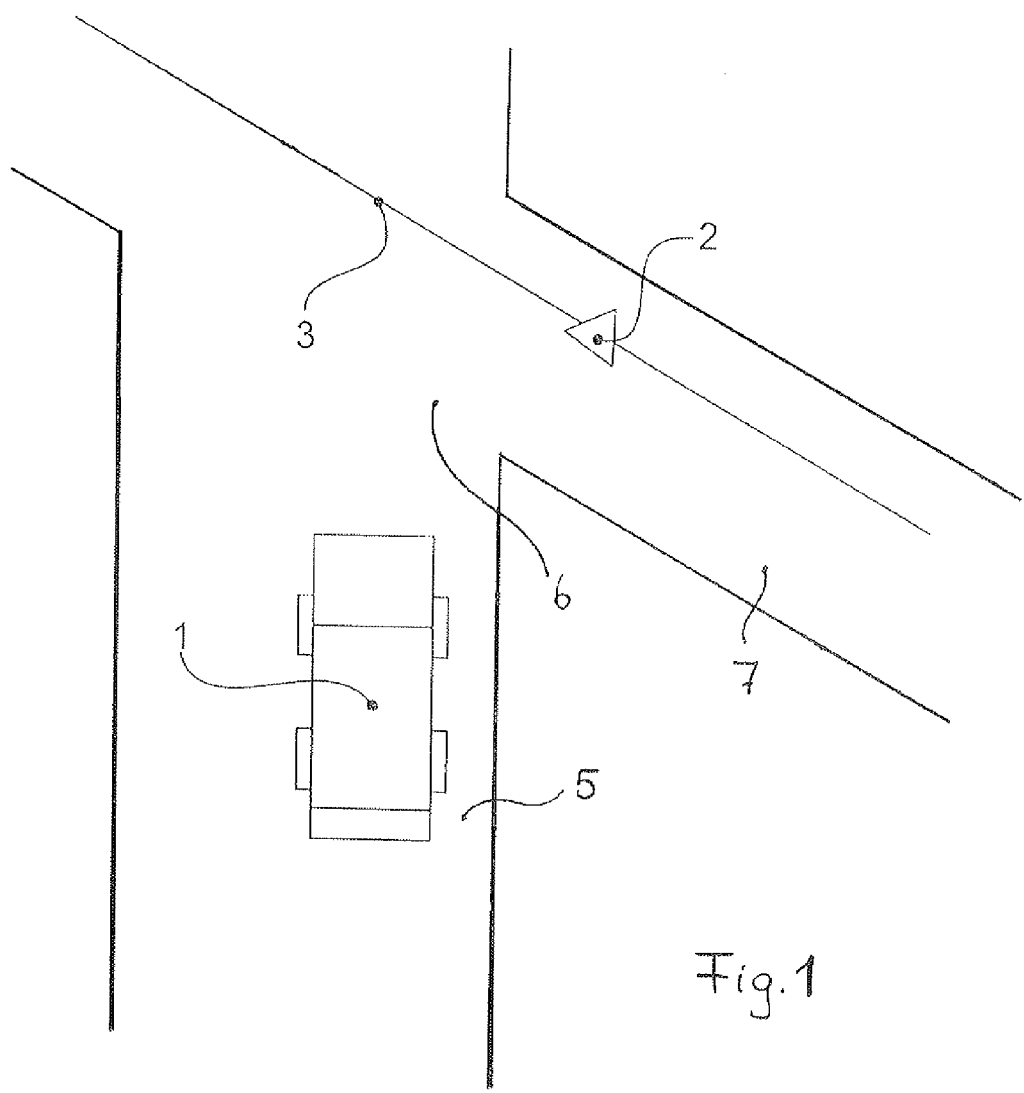
FIG. 1 an exemplary embodiment of a test device in accordance with the invention and an intersection in a plan view from above.
Figure 2:
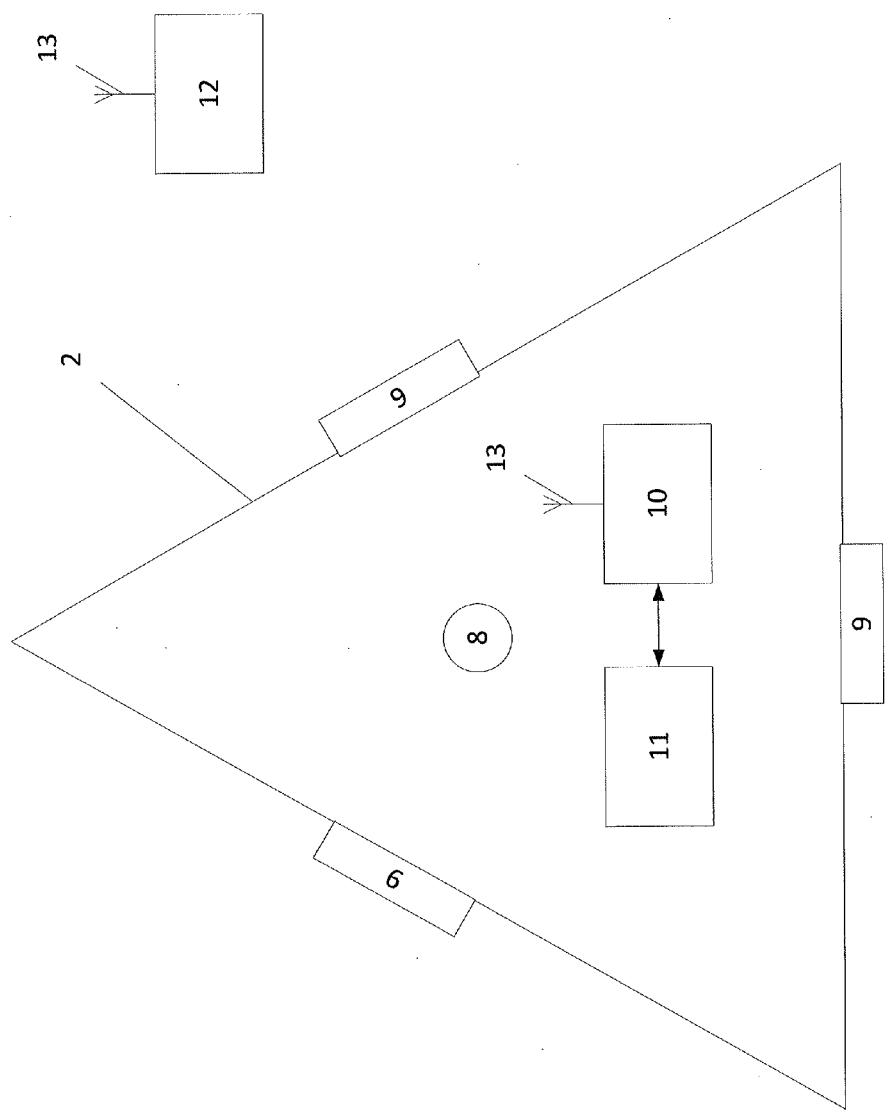
FIG. 2 an exemplary embodiment of dummy device 2.

FIG. 1 illustrates a motor vehicle (car) 1 that moves on a roadway 5 in the direction of an intersection 6. A dummy device 2 moves along a further roadway 7 in a transverse direction with respect to the roadway 5. The roadway 5 and the further roadway 7 form the intersection 6. The dummy device 2 is embodied as a three-cornered prism in the form of a box connected to cable 3 by connector 8 and moves along a cable 3 that is arranged above the roadway 7. The box of the dummy device 2 contains in particular electronic components 11 that are also present in an actual vehicle that is represented by the dummy device 2. Further characteristics of the actual vehicle, such as yaw rate, steering wheel angle or transverse acceleration are simulated by the dummy device 2.

The cable 3 is arranged in such a manner that the dummy device 2 moves at a slightly greater height than the vehicle 1, so that said dummy device on the one hand cannot collide with the first vehicle 1 and on the other hand it is not perceived as a vehicle that is moving across a bridge. Different situations at the intersection 6 are now tested using the vehicle 1 and the dummy device 2, which includes in each case also the C2X communication between the vehicle 1, the dummy device 2 that represents the second vehicle, and infrastructure devices, such as traffic lights, that are arranged at the intersection 6. Both the vehicle 1 and also the dummy device 2 comprise for this purpose in each case a transmitter and a receiver (antenna) for the C2X communication in transceiver 10 with flexible antenna 13. Data is exchanged by means of the C2X communication between the vehicle 1, the dummy device 2 and infrastructure devices at the intersection 6 (for example traffic lights).

A transverse traffic assistant, for example, can be tested by means of the test device described above. For this purpose, the dummy device 2 simulates the transverse traffic for the vehicle 1. In so doing, the speed and movement of the dummy device 2 are selected such that a collision with the vehicle 1 would occur at the intersection 6.

The vehicle 1 receives all the information regarding the dummy device 2 by means of the C2X communication. In addition, the dummy device 2 is equipped with reflectors 9, for radar, so that the vehicle 1 can recognize the dummy device 2 using its radar sensors. It is possible using this assembly to test transverse traffic assistance systems with active intervention without a serious collision occurring in the event of a malfunction.

The dummy device 2 can be used in a further example also to test a left turn assistant. For this purpose, the dummy device 2 moves in the opposite direction to the vehicle 1 and as a consequence simulates opposing traffic. The cable 3 of the test device illustrated in FIG. 1 would in this case run along the roadway 5, for example in a channel that is let into the base of the roadway 5. The movement and speed of the dummy device 2 are selected in the test situation such that a collision would occur at the point where the vehicle 1 turns at the intersection 6. The vehicle 1 can recognize the dummy device 2 by means of a camera and radar since corresponding dummies and/or reflectors are attached to the dummy device. In addition, information is exchanged between the dummy device 2 and the vehicle 1 by means of the C2X communication.

When functioning correctly, in the event that the driver wishes to turn left or during the course of the turning procedure the left turn assistant of the vehicle 1 warns its driver of the opposing traffic that is simulated by the dummy device 2. In the event of a malfunction of the left turn assistant in the vehicle 1, the vehicle 1 can drive into the dummy device 2 without significant damage being incurred by the vehicle 1. Dummy device 2 can also be remotely controlled by remote control 12. Dummy device 2 can also simulate a driver assistance system of another vehicle using electronics 11.

LIST OF REFERENCE NUMERALS

1 First vehicle
2 Dummy device
3 Cable
5 Roadway
6 Intersection

7 Further roadway, running in a transverse manner with respect to the roadway 5

The invention claimed is:

1. A dummy device for testing a safety and/or driver assistance system of a first vehicle traveling on a roadway section including:
   a transceiver for communicating with the first vehicle; and
   a processor for simulating a driver assistance system of a second vehicle traveling in a different direction than the first vehicle;
   wherein the dummy device travels above the roadway and is configured to test the driver assistance system of the first vehicle by simulating the driver assistance system of the second vehicle, the simulating of the driver assistance system of the second vehicle including simulating vehicle data related to the operation of the second vehicle and transmitting the simulated vehicle data to the first vehicle through the transceiver.

2. The device as claimed in claim 1, wherein the dummy device is attached to a helicopter, or to an aircraft, or to a floating platform.

3. The device as claimed in claim 1, wherein the transceiver of the dummy device can protrude into a movement space of the first vehicle, and wherein the transceiver of the dummy device is embodied in a physically flexible manner.

4. The device as claimed in claim 1, wherein the dummy device can be remotely controlled.

5. The device as claimed in claim 1, wherein the dummy device is embodied in such a manner that at least one sensor and/or at least one driver assistance system and/or at least one safety system of the second vehicle that is represented by the dummy device are simulated.

6. The device as claimed in claim 1, wherein the dummy device comprises at least one dummy and/or at least one reflector, that render it possible to recognize the dummy device by at least one environment sensor of the first vehicle.

7. The device as claimed in claim 1, wherein the predetermined roadway section is an intersection.

8. The device as claimed in claim 1, wherein the dummy device is embodied as a slide that moves above, below and/or to the side of the movement space of the first vehicle.

9. The device as claimed in claim 8, wherein the slide moves on rails or on at least one cable.

* * * * *